United States Patent
Nimon et al.

(10) Patent No.: US 8,639,126 B1
(45) Date of Patent: Jan. 28, 2014

(54) COARSE FREQUENCY OFFSET ESTIMATION AND CORRECTION FOR HIGH-SPEED OPTICAL COMMUNICATIONS

(75) Inventors: Matthew Nimon, Hinckley, OH (US); Fan Mo, Hinckley, OH (US); William Thesling, Hudson, OH (US); Sameep Dave, Hinckley, OH (US)

(73) Assignee: ViaSat, Inc., Carlsbad, CA (US)

( * ) Notice: Subject to any disclaimer, the term of this patent is extended or adjusted under 35 U.S.C. 154(b) by 103 days.

(21) Appl. No.: 13/356,159

(22) Filed: Jan. 23, 2012

Related U.S. Application Data

(60) Provisional application No. 61/435,278, filed on Jan. 22, 2011.

(51) Int. Cl.
 *H04B 10/00* (2013.01)
(52) U.S. Cl.
 USPC .......................................... 398/203; 398/204
(58) Field of Classification Search
 USPC ................................. 398/202–214
 See application file for complete search history.

(56) References Cited

U.S. PATENT DOCUMENTS

| | | | | |
|---|---|---|---|---|
| 4,965,858 | A * | 10/1990 | Naito et al. | 398/205 |
| 6,304,620 | B1 * | 10/2001 | Rouphael | 375/344 |
| 7,251,256 | B1 | 7/2007 | Barry et al. | |
| 7,266,310 | B1 | 9/2007 | Savory et al. | |
| 7,636,525 | B1 * | 12/2009 | Bontu et al. | 398/208 |
| 7,856,068 | B1 * | 12/2010 | Tung et al. | 375/267 |
| 7,899,340 | B1 * | 3/2011 | Bontu et al. | 398/209 |
| 8,078,066 | B2 * | 12/2011 | Li et al. | 398/209 |
| 8,095,019 | B2 * | 1/2012 | Kaneda et al. | 398/208 |
| 8,103,177 | B2 * | 1/2012 | Zhang et al. | 398/208 |
| 8,355,637 | B2 * | 1/2013 | Sano et al. | 398/204 |
| 8,374,512 | B2 * | 2/2013 | Tao et al. | 398/202 |
| 8,406,638 | B2 * | 3/2013 | Hoshida | 398/202 |
| 8,472,814 | B2 * | 6/2013 | Zhang et al. | 398/208 |
| 8,526,831 | B2 * | 9/2013 | Winzer | 398/209 |
| 2004/0184487 | A1 | 9/2004 | Kim | |
| 2004/0223767 | A1 | 11/2004 | Pappalardo et al. | |
| 2006/0013590 | A1 | 1/2006 | Hueda et al. | |
| 2007/0036555 | A1 * | 2/2007 | Chen et al. | 398/188 |
| 2007/0065078 | A1 | 3/2007 | Jiang | |
| 2007/0071456 | A1 * | 3/2007 | Chen et al. | 398/204 |
| 2007/0206963 | A1 * | 9/2007 | Koc | 398/202 |

(Continued)

FOREIGN PATENT DOCUMENTS

EP   2352239 A1   8/2011

OTHER PUBLICATIONS

Non-final Office Action dated Dec. 28, 2012, U.S. Appl. No. 13/205,431 to Mo et al., 12 pgs.

(Continued)

*Primary Examiner* — Agustin Bello
(74) *Attorney, Agent, or Firm* — Holland & Hart LLP

(57) ABSTRACT

Methods, systems, and devices are described for compensating for a coarse frequency offset between a received optical signal and a local oscillator at a demodulator. Multiple samples are received of an output of a discrete Fourier transform performed on the received optical signal. A magnitude of each sample is determined, and the determined magnitudes may be filtered by a digital domain filter. A difference is computed between the determined magnitudes for a first set of the samples and the determined magnitudes for a second set of the samples, and a local oscillator correction factor is generated based on at least the computed difference.

24 Claims, 10 Drawing Sheets

(56) References Cited

U.S. PATENT DOCUMENTS

| | | |
|---|---|---|
| 2007/0217792 A1 | 9/2007 | Nonaka et al. |
| 2008/0152361 A1* | 6/2008 | Chen et al. ............ 398/205 |
| 2010/0209121 A1 | 8/2010 | Tanimura |
| 2010/0232809 A1 | 9/2010 | Cai et al. |
| 2010/0239264 A1 | 9/2010 | Yang et al. |
| 2010/0329677 A1 | 12/2010 | Kaneda et al. |
| 2011/0064421 A1 | 3/2011 | Zhang et al. |
| 2011/0255877 A1* | 10/2011 | Nakashima et al. ...... 398/202 |
| 2012/0033965 A1* | 2/2012 | Zhang et al. ............ 398/38 |

OTHER PUBLICATIONS

International Search Report and Written Opinion dated Aug. 30, 2012, PCT/US2012/022231 to ViaSat, Inc. et al., 8 pgs.
International Search Report and Written Opinion dated Aug. 30, 2012, PCT/US2012/022234 to ViaSat, Inc. et al., 10 pgs.
International Preliminary Report on Patentability dated Aug. 1, 2013, Int'l App. No. PCT/US2012/022231 to ViaSat, Inc. et al., 5 pgs.
Non-final Office Action dated Jul. 29, 2013, U.S. Appl. No. 13/205,431 to Mo et al., 12 pgs.

* cited by examiner

COARSE FREQUENCY OFFSET ESTIMATION AND CORRECTION FOR HIGH-SPEED OPTICAL COMMUNICATIONS

CROSS REFERENCES

The present application claims the benefit of U.S. Provisional Patent Application No. 61/435,278, filed on Jan. 22, 2011, entitled "HIGH RATE OPTICAL COMMUNICATION," which is incorporated herein by reference in its entirety.

BACKGROUND

The present disclosure relates to systems and methods for coarse frequency offset estimation and correction in a fiber optic communications system.

Fiber optic channels in network communications systems are well known and are considered effective for data transmission, allowing relatively high bandwidth data communication. Optical fiber used in such channels is flexible and can be bundled as cables, and is generally considered to be appropriate for long-distance communications because light propagates through the fiber with little attenuation compared to electrical cables. Typical present day commercial optical fiber systems transmit data at 10 or 40 Gbit per second. Each fiber can carry multiple independent channels, each using a different wavelength of light in a technique known as wavelength-division multiplexing (WDM), thereby enhancing the net data rate of an optical fiber.

As more capacity is continually desired for networks, a demand for increased data transmission rates exists. However, in fiber optic systems, as data rates increase various optical phenomena begin to manifest and act to limit data transmission rates. For example, carrier frequency offsets may occur between optical transmitters and receivers and detrimentally affect the ability of a receiver to demodulate and decode a transmitted optical signal.

SUMMARY

Methods, systems, and devices are described for coarse frequency offset estimation and correction for high-speed optical communications.

In a first set of embodiments, a method of compensating for a coarse frequency offset between a received optical signal and a local oscillator at a demodulator includes receiving a plurality of samples of an output of a discrete Fourier transform performed on the received optical signal, determining a magnitude of each sample, computing a difference between the determined magnitudes for a first set of the samples and the determined magnitudes for a second set of the samples, and generating a local oscillator correction factor based on at least the computed difference.

In a second set of embodiments, an apparatus for compensating for frequency offset between a received optical signal and a local oscillator at a demodulator includes a sampling module, a magnitude determination module, an offset determination module, and a local oscillator correction module. The sampling module is configured to receive a plurality of samples of an output of a discrete Fourier transform performed on the received optical signal. The magnitude determination module is configured to determine a magnitude of each sample. The offset determination module is configured to compute a difference between the determined magnitudes for a first set of the sample and the determined magnitudes for a second set of the samples. The local oscillator correction module is configured to generate a local oscillator correction factor based on at least the computed difference.

In a third set of embodiments, a system of compensating for frequency offset between a received optical signal and a local oscillator at a demodulator includes means for receiving a plurality of samples of an output of a discrete Fourier transform performed on the received optical signal, determining a magnitude of each sample; computing a difference between the determined magnitudes for a first set of the samples and the determined magnitudes for a second set of the samples; and generating a local oscillator correction factor based on at least the computed difference.

BRIEF DESCRIPTION OF THE DRAWINGS

A further understanding of the nature and advantages of embodiments of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Methods, systems, and devices are described for coarse frequency offset estimation and correction for high-speed optical communications. Coarse frequency offset estimation and correction may be used at a demodulator device to reduce a frequency offset between a received optical signal and a local oscillator to a level at which fine tuning circuitry can achieve a lock on the carrier frequency of the received optical signal. To achieve the coarse frequency offset estimation and correction, samples at the output of a discrete Fourier transform of the received optical signal are taken, and the magnitude of each sample is computed. These magnitudes may be filtered via a first order digital domain filter, such as an infinite impulse response (IIR) filter. The magnitudes may then be combined algebraically to compute a difference between the combined magnitudes of a first set of the samples and the combined magnitudes of a second set of the samples. A local oscillator correction factor may be generated based on at least the computed difference.

This description provides examples, and is not intended to limit the scope, applicability or configuration of embodiments of the principles described herein. Rather, the ensuing description will provide those skilled in the art with an enabling description for implementing embodiments of the principles described herein. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

Figure 1:
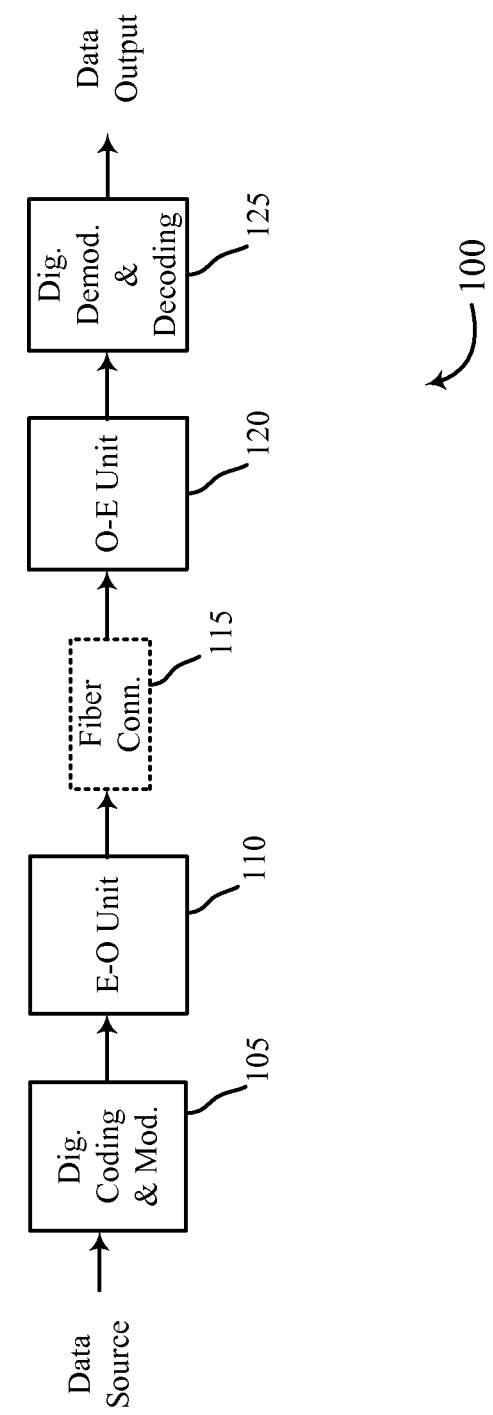
FIG. 1 is a block diagram of an example optical communication system including components configured according to various embodiments of the principles described herein.

Systems, devices, methods, and software are described for an optical communication system that utilizes fiber optic optical cables as a data transmission medium. An example of an optical data transport system 100 is illustrated in FIG. 1. In the present example, the optical data transport system 100 includes a digital coding and modulation unit 105, an electrical-to-optical (E-O) unit 110, a fiber connection 115, an optical-to-electrical (O-E) unit 120, a digital demodulation and decoding unit 125. Each of these components may be in communication, directly or indirectly.

In the present embodiment, the optical data transport system 100 includes a data source that provides data to a digital coding and modulation unit 105. The data source may include any of a number of common data sources, such as a user telecommunications device, a cable operator head-end unit, a telecommunications provider central office, a computer server, or a network attached storage system, to name but a few examples. In many embodiments, the data source generates significant quantities of data to be transported across the optical data transport system 100.

The digital coding and modulation unit 105 receives this data, and performs framing, forward error correction coding, and modulation functions on the data. The electrical-to-optical (E-O) unit 110 transforms the data into optical signals, and transmits optical signals containing the data via a fiber connection 115. The fiber connection 115 may include well known components of such connections, including a fiber optic cable. An optical-to-electrical (O-E) unit 120 receives the optical signal from the fiber connection 115, and transforms the data into the electrical domain.

The digital demodulation and decoding unit 125 receives the digitized version of the optical signal and performs demodulation, forward error correction decoding, and de-framing functions on the data from the optical signal. The digital demodulation and decoding unit 125 may then output the data (e.g., to a user telecommunications device, a cable operator head-end unit, a telecommunications provider central office, a computer server, or a network attached storage system).

The digital demodulation and decoding unit 125 may perform demodulation on the digitized version of the optical signal by locking a local oscillator to a carrier frequency associated with the optical frequency and measuring data modulation in the digitized version of the optical signal with respect to the frequency of the local oscillator. However, in certain examples the carrier frequency of the optical signal may not be known by the digital demodulation and decoding unit 125. Consequently, it may be appropriate to provide frequency offset compensation functionality at the digital demodulation and decoding unit 125 to allow the digital demodulation and decoding unit 125 to dynamically lock its local oscillator to the carrier frequency and correctly demodulate and decode the data.

Figure 2:
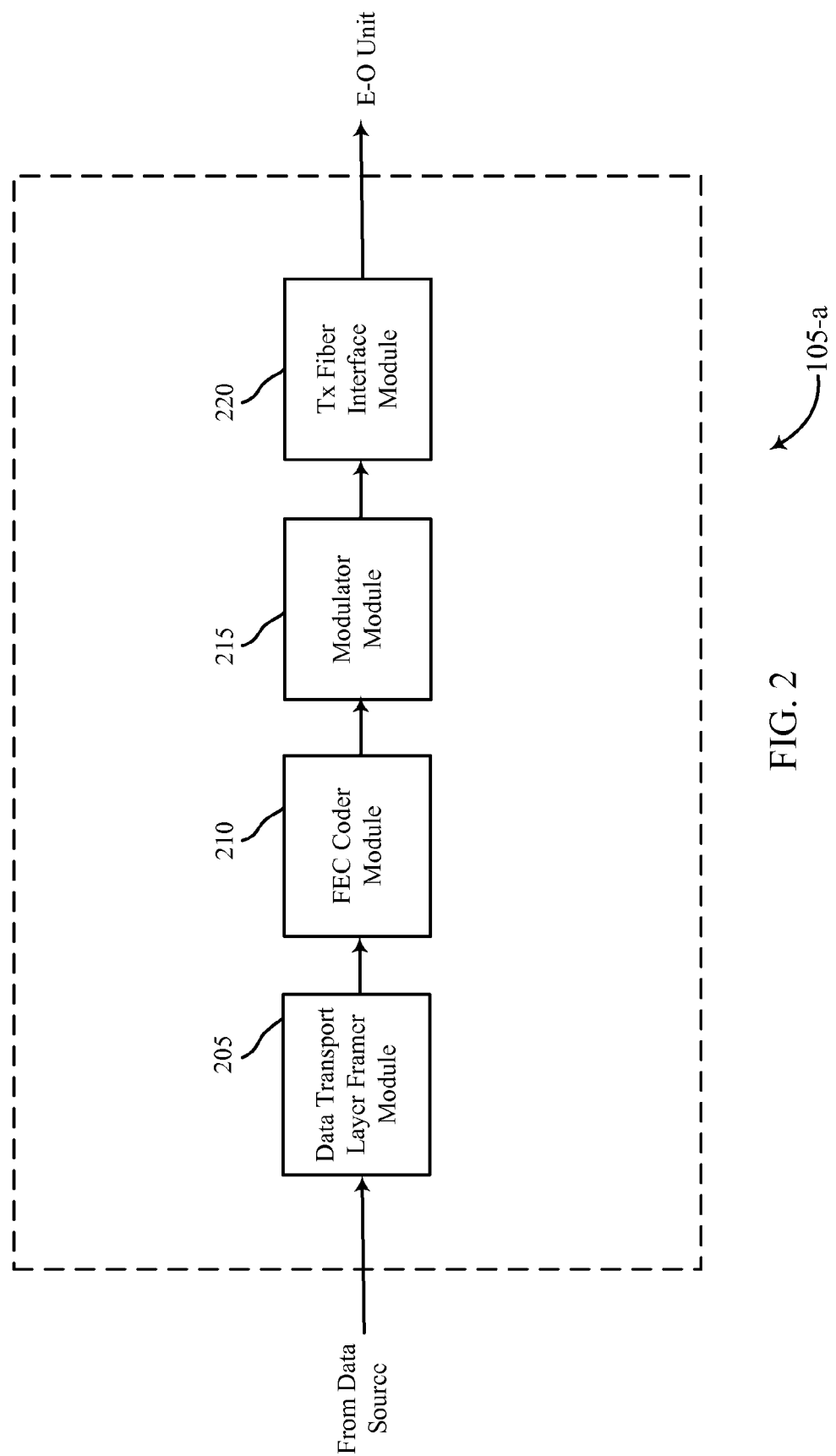
FIG. 2 is a block diagram of an example electrical-to-optical unit according to various embodiments of the principles described herein.

FIG. 2 illustrates a digital coding and modulation unit 105-a. The digital coding and modulation unit 105-a may be an example of the digital coding and modulation unit 105 described above with reference to FIG. 1. In the illustrated embodiment, the digital coding and modulation unit 105-a includes a data transport layer framer module 205, an FEC coder module 210, a modulator module 215, and a transmitter fiber interface module 220. Each of these components may be in communication, directly or indirectly.

The data transport layer framer module 205 may place the data received from the data source into packet frames for transmission. The packet frames may conform to one of many common protocols for packet frames used in optical communications systems which commonly include a header and a payload, and possibly a trailer, such as a CRC. As is well understood, the header may be interleaved with the payload during transmission, depending upon the particular protocol being used for optical transmission.

The FEC coder module 210 calculates and adds forward error correction (FEC) information to the frames of data received from the data transport layer framer module 205. The particular type of FEC information of various embodiments generally includes systematically generated redundant error-correcting code (ECC) data that is transmitted along with the frames. There may be differential encoding used in some embodiments.

The modulator module 215 modulates the frames and FEC information, forwarding the data to a transmitter fiber interface module 220. The transmitter fiber interface module 220 may forward the modulated data to the E-O module where it may be transmitted in the optical domain via a dual-polarity (dual-pole) quadrature phase-shift-keying (QPSK) modulation, resulting in four parallel optical streams (e.g., a horizontal in-phase (HI) stream, a horizontal quadrature (HQ) stream, a vertical in-phase (VI) stream, and a vertical quadrature (VQ) stream). Other modulation schemes may be used in other examples, as well. The modulator module 215 may use an oscillator to generate a carrier frequency onto which the data is modulated. Due to local oscillator drift and/or imperfect transmission through the E-O unit, optical fiber, and the O-E unit, the carrier frequency may experience a certain degree of drift by the signal as it is demodulated. It may be appropriate to provide frequency offset estimation and correction at a demodulator to compensate for these and other changes to the carrier frequency.

Figure 3:
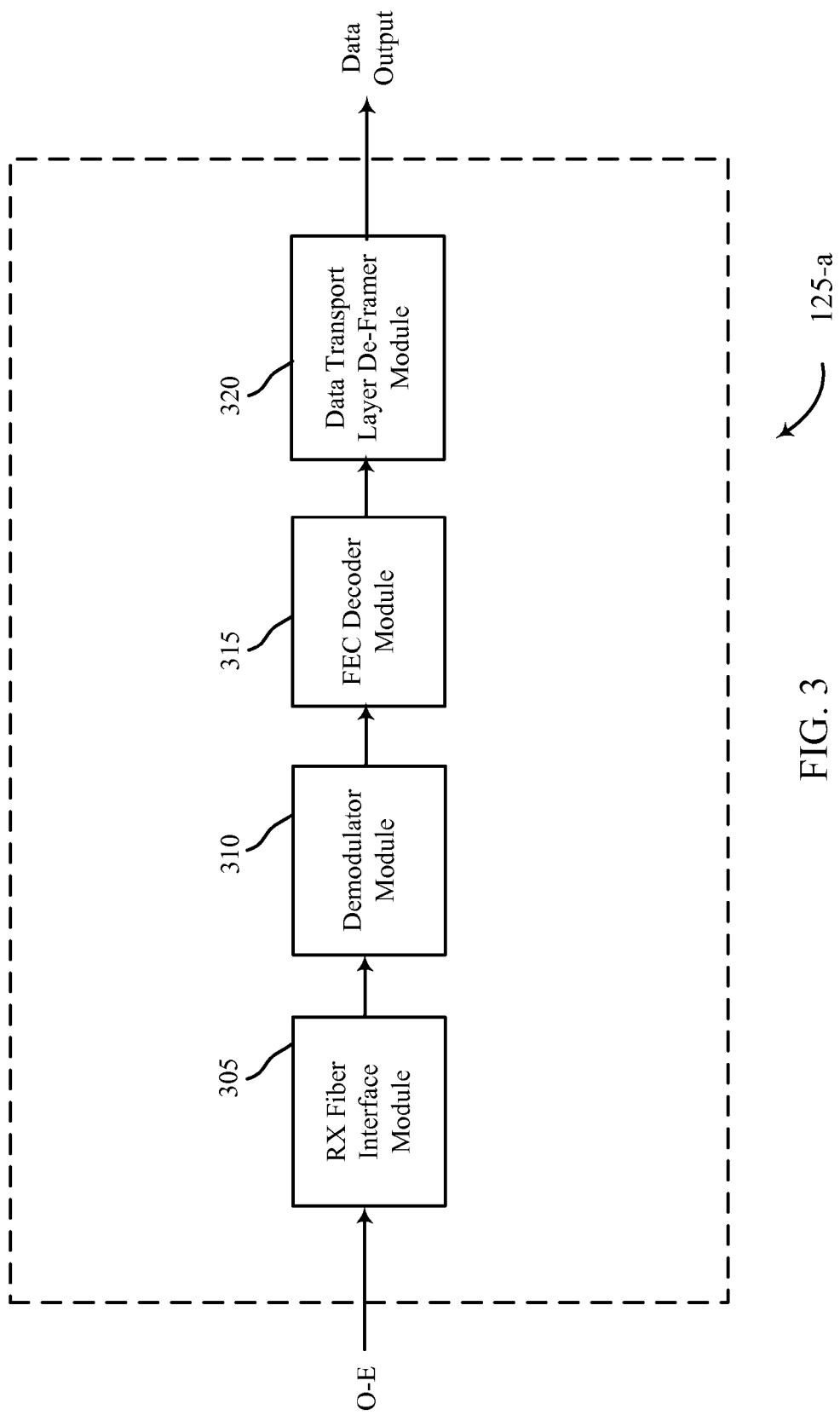
FIG. 3 is a block diagram of an example optical-to-electrical unit according to various embodiments of the principles described herein.

As illustrated in FIG. 3, a digital demodulation and decoding unit 125-a may include a number of modules, as well. The digital demodulation and decoding unit 125-a may be an example of the digital demodulation and decoding unit 125 described above with reference to FIG. 1. In this embodiment, the digital demodulation and decoding unit 125-a includes a receiver fiber interface module 305, a demodulator module 310, an FEC decoder module 315, and a data transport layer de-framer module 320. Each of these components may be in communication, directly or indirectly.

The receiver fiber interface module 305 is an interface between the O-E unit 120 and the demodulator module 310. The receiver fiber interface module 305 provides electrical signals to a demodulator module 310. Various embodiments of the demodulator module 310 will be discussed in further detail below. The information from the demodulator module 310 is provided to the FEC decoder module 315 which decodes and may correct transmission errors identified from error-correcting code. The FEC decoder module 315 provides decoded data to the data transport layer de-framer module 320, which de-frames the data from the signal according to the particular protocol used in the optical transmission, and provides output data. The data output may be, for example, a user or any receiving system.

Figure 4:
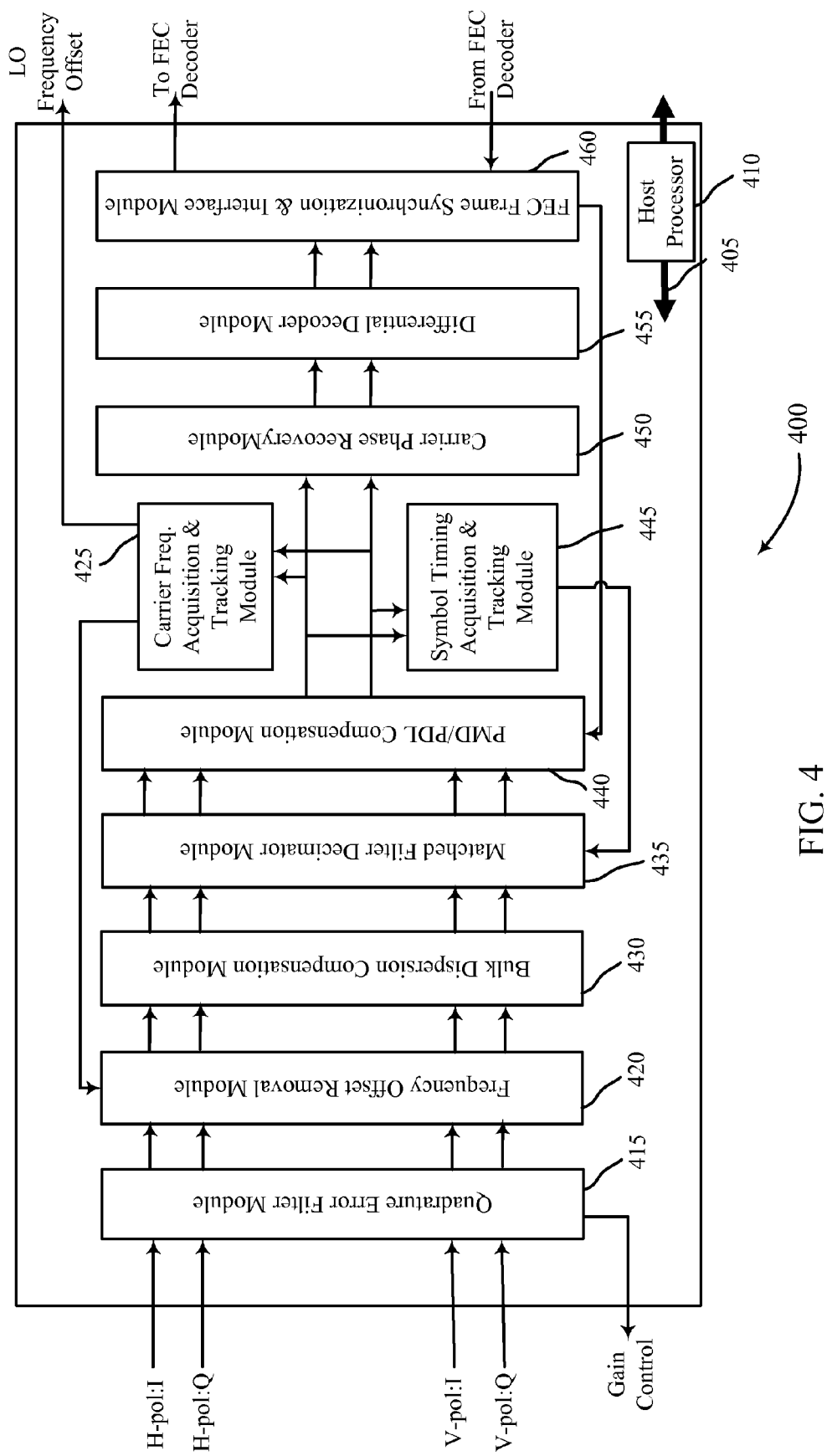
FIG. 4 is a block diagram of an example demodulator unit according to various embodiments of the principles described herein.

Referring now to FIG. 4, a demodulator unit 400 is described. This may be the demodulator module 310 of FIG. 3. In this example, two polarization components are received, one horizontal component (H) and one vertical component (V). Each of the H and V components includes both an in-phase (I) component and a quadrature (Q) component. For reference, the two components in the horizontal polarization are referred to as HI (horizontal in-phase component) and HQ (horizontal quadrature component). Similarly, the two components in the vertical polarization are referred to as VI (vertical in-phase component) and VQ (vertical quadrature component). The demodulator unit 400 processes the digitized samples of the I and Q components of the two polarization components to recover the transmitted data. At the input, the demodulator unit 400 accepts the four parallel streams carrying HI, HQ, VI and VQ samples. In one embodiment, each stream contains multiple samples per clock. At its output the demodulator may provide demodulated hard-decision data (although in other examples, soft-decision data may be provided) to the FEC decoder module (e.g., FEC decoder module 315 of FIG. 3). The demodulator unit 400 may identify the beginning of an FEC frame. Additionally, in some embodiments the demodulator unit 400 receives feedback signals from the FEC decoder module 315 regarding the convergence status for error correction.

In some embodiments, the demodulator unit 400 is implemented as an application specific integrated circuit (ASIC) that includes a number of functional modules. In such embodiments, the demodulator unit 400 may have a control and monitor interface bus 405 connected to a host processor 410 allowing for configuration of demodulator parameters (filter coefficients, loop gains, etc.) and extraction of demodulator status. With continuing reference to FIG. 4, several of the sub-modules within the demodulator unit 400 of various embodiments are described. In this embodiment, a quadrature error filter (QEF) module 415 provides a collection of data formatting, error detection and correction functions. In one embodiment, input data samples are expected to be in binary-offset/offset-binary format and are converted to a two's complement (2C) format for processing within a digital signal processor. The incoming HI, HQ, VI and VQ streams, in some embodiments, also can be independently swapped and inverted if appropriate, allowing for any design issues that might translate into an accidental inversion or I/Q swap. Each data stream of these various embodiments may be processed to remove polarization skew (between H and V poles) as well as I-Q skew within a pole. The QEF module 415 may provide for detection and removal of four types of quadrature signal errors: I/Q skew, DC bias, I/Q amplitude imbalance, and I/Q phase imbalance. All four error detectors may be independently enabled or disabled, in some embodiments, via the processor interface, and the detected error values are output as status values via this same interface. The QEF module 415 may also output a gain control signal that may be used by other components of the system.

The QEF module 415 is connected to a frequency offset removal module 420. The frequency offset removal module 420 in one example performs a frequency rotation on the data samples coming out of the QEF module 415. The amount of frequency rotation is controlled by a frequency error input that is sourced by a carrier frequency acquisition and tracking (CFAT) module 425. Such frequency offset removal function may remove residual frequency left from the local oscillator (LO) laser tuning in the optical domain. A bulk dispersion compensation module 430 removes bulk chromatic dispersion from the horizontal and vertical polarization channels. The compensation may be applied via a filter in the frequency domain. The amount of correction may be controlled by the chromatic dispersion filter inputs that are derived outside of the demodulator module 400 and provided via the host processor 410 and control and monitor interface bus 405, in this embodiment.

A matched filter decimator (MFD) module 435 may implement an interpolation function that provides decimation on samples taken at two+$\epsilon$ times the symbol rate. In one embodiment, each of the four data streams has an independent bank of FIR filters with selected coefficients. The incoming data is processed through the filter banks to produce two samples per symbol out for each data stream. Data samples are gathered and assembled into blocks of fixed numbers of samples per stream per clock by a sample block assembler. The assembly function may be identical for the I and Q streams in each polarization, so one assembly block may service two streams. A PMD/PDL compensation module 440 may utilize adaptive equalization to compensate for cross-polarization interference, I/Q channel interference, adjacent symbol interference introduced by PMD and PDL in optical channel and other residual impairments, such as residual chromatic as mentioned above. On one embodiment, an adaptive equalizer takes in data at one or two samples/symbol from the MFD and processes the data through a bank of FIR filters with adaptive filter tap coefficients.

In some embodiments, a symbol timing acquisition and tracking (STAT) module 445 may estimate symbol timing using an early/late symbol radius matching scheme and PI controller, and generate an error signal to correct symbol timing. This STAT module 445, in an embodiment, also has a symbol timing lock detection mechanism that outputs a symbol lock indicator. In various embodiments, there are two sets of gains for the PI controller (wide band for acquisition and narrow band for tracking). When not in timing lock, the wideband gains may be used, otherwise, the narrowband gains may be used. The STAT module 445 may perform symbol timing acquisition and tracking of a portion of the optical signal after the PMD/PDL compensation module 440 compensates for interference caused by PMD and PDL and before carrier phase recovery on the portion of the optical signal.

The CFAT module 425 may be responsible for acquiring, as well as tracking, carrier frequency. Carrier frequency acquisition is achieved using one of a number of techniques, such as through Fast Fourier transform (FFT) with appropriate averaging and peak frequency component detection. The CFAT module 425 may provide a frequency error input to the frequency offset removal module 420. The CFAT module 425, in some embodiments, also provides local oscillator (LO) frequency offset output that may be used with data from the FEC frame synchronization and interface module 460. A carrier phase recovery (CPR) module 450 may use a feed-forward algorithm with a block phase estimator and a phase rotation function to remove residual frequency and phase errors. The CPR module 450 may operate on the on-time data samples produced by the PMD compensation module. A differential decoder module 455 may be responsible, in various embodiments, for accepting symbol streams from the CPR module 450 (e.g., at 1 sample per symbol). The differential decoder module 455 may be configured to differentially decode the signal and provide the decoded output (e.g., a hard-decision output data stream) to the FEC frame synchronization and interface module 460. The FEC frame synchronization and interface module 460 processes data to achieve frame synchronization, and may include three functional blocks for data alignment, frame sync detection, and clock transfer. The FEC frame synchronization and interface module 460 may be configured to skew, swap, and rotate received channels with respect to each other.

Figure 5:
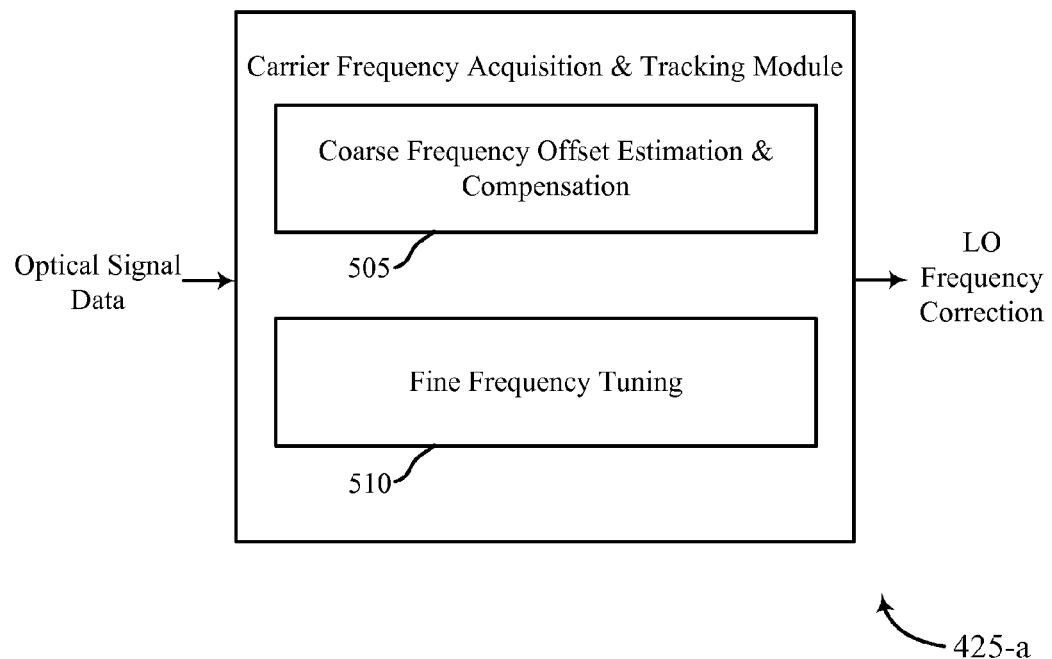
FIG. 5 is a block diagram of an example carrier frequency acquisition and tracking module according to various embodiments of the principles described herein.

FIG. 5 illustrates a block diagram of a carrier frequency and tracking module 425-*a*. The carrier frequency and tracking module 425-*a* may be an example of the carrier frequency and tracking module 425 described above with reference to FIG. 4. The carrier frequency and tracking module 425-*a* of the present example includes a coarse frequency offset estimation and compensation module 505 and a fine frequency tuning module 510. Each of these components may be in communication, directly or indirectly.

As described above, the carrier frequency and tracking module 425-*a* may be configured to acquire and track carrier frequency. The carrier frequency and tracking module 425-*a* may receive digital samples of the optical signal from the PMD/PDL compensation module 440 of FIG. 4, from another module in a pipeline of the demodulator, and/or directly from an O-E unit or another source. The fine frequency tuning module 510 may be configured to track and lock onto the carrier frequency when a relatively small offset between the local oscillator frequency and the carrier frequency exists. Carrier frequency acquisition and locking may be achieved in the fine frequency tuning module 510 by means of a Fast Fourier Transform (FFT) with appropriate averaging and peak frequency component detection. Frequency error may be processed through a proportional-integral (PI) controller to produce a filtered frequency error, which may be used to produce a local oscillator (LO) frequency correction factor or control signal.

The fine frequency tuning module 510 may be able to achieve frequency lock only within a relatively narrow range of frequency offsets. For example, the fine frequency tuning module 510 may achieve frequency lock when the offset is within the range of ±12.5% of the symbol rate of the modulated optical signal. However, in certain examples the demodulator may operate with larger frequency offsets (e.g., greater than ±12.5% of the symbol rate). In these examples, the coarse frequency offset estimation and compensation module 505 may provide less-precise local oscillator frequency correction to bring the frequency offset into the range where the fine frequency tuning module 510 may lock the local oscillator to the carrier frequency.

Figure 6:
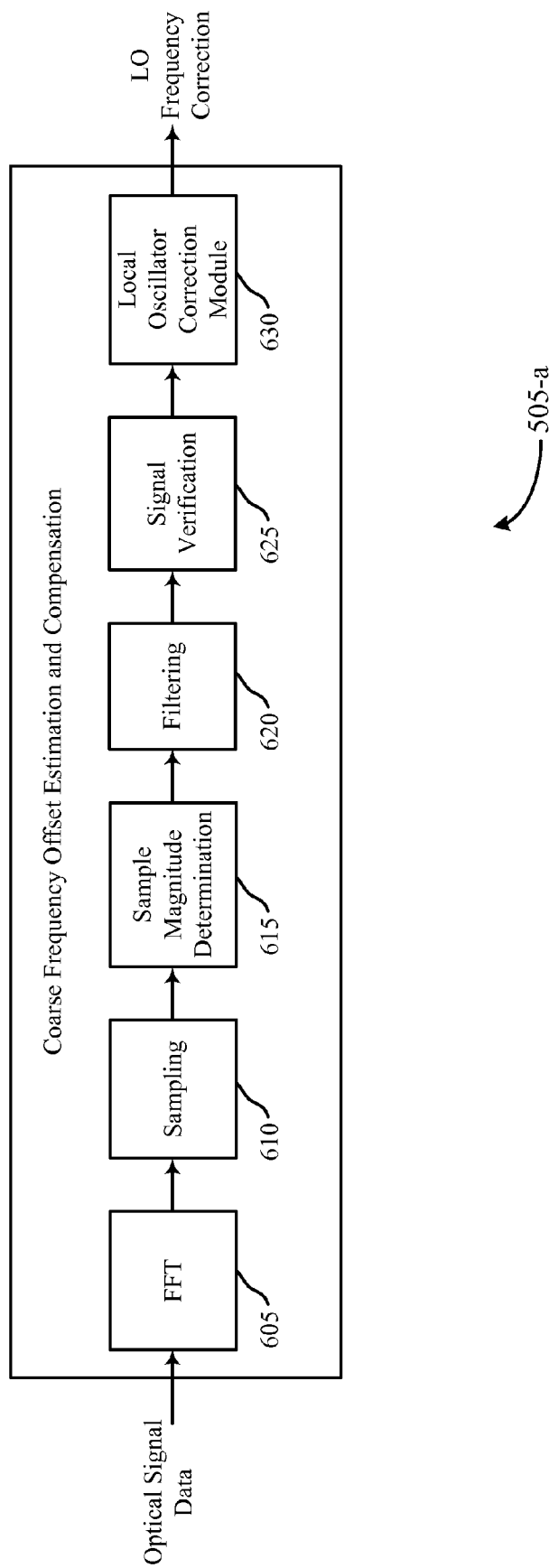
FIG. 6 is a block diagram of an example coarse frequency estimation unit according to various embodiments of the principles described herein.

FIG. 6 illustrates a block diagram of one example of a coarse frequency offset and compensation module 505-*a*. The coarse frequency offset and compensation module 505-*a* may be an example of the coarse frequency offset compensation module 505 described above with reference to FIG. 5. The coarse frequency offset and compensation module 505-*a* of the present example may include a Fast Fourier Transform (FFT) module 605, a sampling module 610, a sample magnitude determination module 615, a filtering module 620, a signal verification module 625, and a local oscillator correction module 630. Each of these components may be in communication, directly or indirectly.

The FFT module 605 may be shared with another component of the demodulator. For example, the FFT module 605 may be provided by chromatic dispersion compensation circuitry within a bulk dispersion compensation module (e.g., bulk dispersion compensation module 430 of FIG. 4) of the demodulator. Alternatively, the FFT module 605 may be specific to the coarse frequency offset and compensation module 505-*a*. Measurements of a received optical signal taken at an optical receiver may be provided to the FFT module 605. The measurements may be provided as at least one in-phase (I) stream and at least one quadrature (Q) stream of bits.

The FFT module 605 may perform a discrete Fourier transform on the measurements from the received optical signal and output a frequency domain representation of each stream. The output for each stream may be received by the sampling module 610, where a number of samples are taken. The samples may be taken substantially concurrently (i.e., during the same clock cycle). In certain examples, each sample may include an in-phase component and a quadrature component. In certain examples, the number and size of the samples may be programmable by a user or other process. The samples may be taken at different portions of the frequency domain.

The sample magnitude determination module 615 may determine a magnitude of each sample. The magnitude of each sample may be computed using, for example a well-known Coordinate Rotation Digital Computer (CORDIC) circuit. For example, the in-phase and quadrature components of each sample may be input respectively as real and imaginary components of a complex number to one or more CORDIC circuits, and the one or more CORDIC circuits may compute a magnitude of each sample.

The filtering module 620 may perform filtering in the digital domain on the sample magnitudes determined by the sample magnitude determination module 615. For example, the magnitudes may be filtered using a first-order Infinite Impulse Response (IIR) filter with a transfer function H(z) having a programmable alpha, as follows:

$$h(z) = \frac{\text{alpha}}{1 - (1 - \text{alpha})z^{-1}}$$

The signal verification module 625 may receive the filtered sample magnitudes and verify that the received optical signal contains valid data by computing the difference between a maximum of the magnitudes and a mean of the magnitudes. If the maximum magnitude is greater than the mean of the magnitudes by less than a programmable input threshold, then it may be determined that the signal is valid.

The local oscillator correction module 630 may subtract the combined magnitudes in a second set of the samples from the combined magnitudes in a first set of the samples to identify imbalances in the frequency response of the received optical signal. Depending on the sign of the difference between the combined magnitudes of the first set and the combined magnitudes of the second set, a local offset frequency correction signal may indicate a high or low offset, and the local oscillator may be adjusted accordingly. In certain examples, the magnitude of the difference between the combined magnitudes of the first set and the combined magnitudes of the second set may indicate the degree to which the frequency of the local oscillator is adjusted to compensate for the offset.

Figure 7:
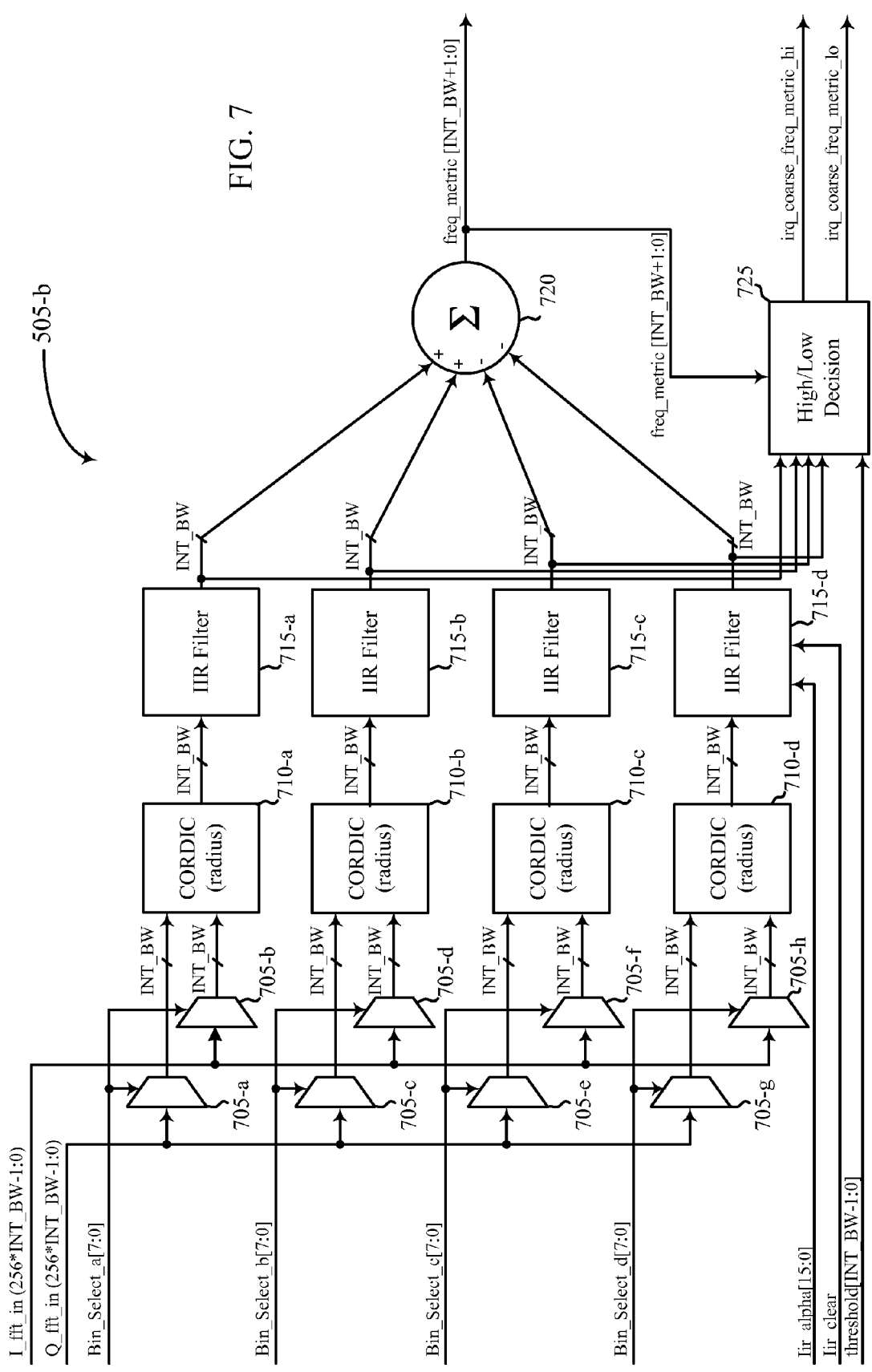
FIG. 7 is a block diagram of an example coarse frequency estimation unit according to various embodiments of the principles described herein.

FIG. 7 illustrates a diagram of circuitry implementing an example of a coarse frequency offset and compensation module 505-b. The coarse frequency offset and compensation module 505-a may be an example of the coarse frequency offset compensation module 505 described above with reference to FIG. 5 or FIG. 6.

In the present example, four samples are taken at the output of an FFT (not shown). The results of an FFT transform performed on a received optical signal are provided as an in-phase component I_fft_in and a quadrature component Q_fft_in. Each of these components contains 256*INT_BW parallel bits, where INT_BW may be a design-specific integer. The FFT results are referred to as samples A, B, C, and D, respectively. These 4 samples may be taken and processed at each clock cycle. The FFT bins selected for sampling may be programmable through a user interface.

The selected FFT bins are routed to respective CORDIC modules 710 using multiplexers 705 and control signals Bin_Select_a, Bin_Select_b, Bin_Select_c, and Bin_Select_d. Each CORDIC module 710 may receive a respective in-phase component and quadrature component of a sample and output a magnitude of that sample to an IIR filter 715. Each IIR filter 715 may have a transfer function of:

$$h(z) = \frac{alpha}{1 - (1 - alpha)z^{-1}}$$

with a programmable alpha provided by the Iir_alpha signal. The Iir_clear signal may clear each IIR filter 715 from feedback provided by other samples. The filtered magnitudes of each sample are referred to as f([A]), f([B]), f([C]), and f([D]), respectively. The filtered magnitudes are combined algebraically at block 720 to form the frequency metric {f([A])+f([B])}−{f([C])+f([D])}. A and B may correspond to the first set of samples described above with reference to FIG. 6, and C and D may correspond to the second set of samples described above with reference to FIG. 6. Thus, the sum {f([A])+f([B])}−{f([C])+f([D])} is the difference between the combined magnitudes of the first set of samples and the second set of samples.

The filtered magnitudes of each sample are also provided to the high/low decision block 725, which computes the following difference:

$$\max(f([A]), f([B]), f([C]), f([D])) - \{(f([A])+f([B])) - (f([C])+f([D]))/4\}$$

The high/low decision block 725 compares this difference to a programmable threshold to determine whether the optical signal carries a valid data signal. If the optical signal carries a valid data signal, a high local oscillator correction factor or a low local oscillator correction factor is output based on the sign of the difference computed algebraically in block 720.

Figure 8:
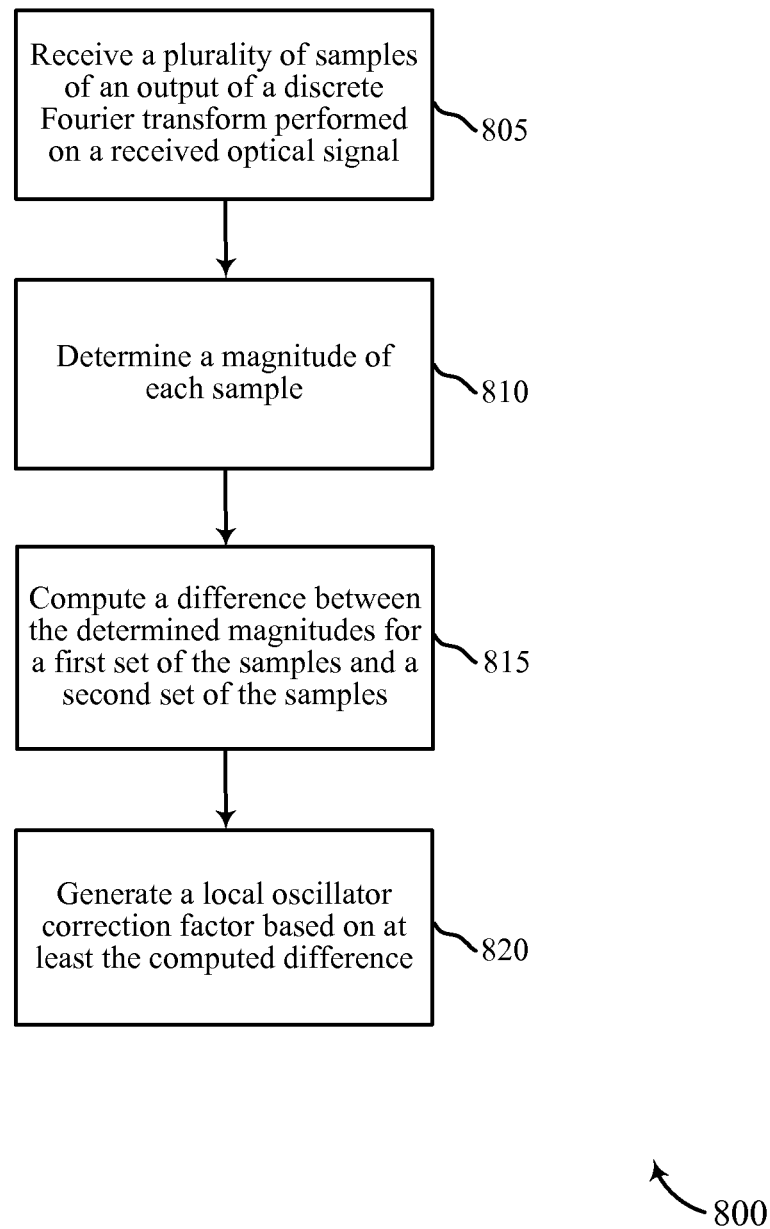
FIG. 8 is a flow chart of a method for compensating for frequency offset between a received optical signal and a local oscillator at a demodulator according to various embodiments of the principles described herein.

FIG. 8 illustrates a flowchart diagram of an example method 800 of compensating for frequency offset between a received optical signal and a local oscillator at a demodulator. The method 800 may be performed, for example, by the digital demodulation and decoding unit 125 of FIG. 1 or FIG. 3, the demodulator module 310, 400 of FIG. 3 or FIG. 4, the carrier frequency acquisition and tracking module 425 of FIG. 4 or FIG. 5, and/or the coarse frequency offset estimation and compensation module 505 of FIG. 5, FIG. 6, or FIG. 7.

At block 805, a plurality of samples is received of an output of a discrete Fourier transform performed on a received optical signal. In certain examples, the received optical signal my include an in-phase stream and a quadrature stream, and each sample from the discrete Fourier transform may include an in-phase component and a quadrature component. The discrete Fourier transform may be performed by Fast Fourier Transform module or circuitry. In certain examples, the discrete Fourier transform results may be provided by a chromatic dispersion compensation module of the demodulator.

At block 810, a magnitude of each sample is determined. In certain examples, the magnitude of each sample may be determined by Coordinate Rotation Digital Computer (CORDIC) circuitry. For instance, the in-phase and quadrature components of each sample may be provided to at least one CORDIC module as a complex number, and the magnitude of each sample may be received from the at least one CORDIC module. In certain examples, each of the magnitudes may be filtered using a digital domain filter, such as an infinite impulse response (IIR) filter.

At block 815, a difference between the determined magnitudes for a first set of the samples and a second set of the samples is computed. In certain examples, the sets may be determined based on their relative positions in the frequency domain. Thus, in one set of embodiments, first, second, third, and fourth samples of the output of an FFT are taken at the same time such that the first, second, third, and fourth samples represent ascending or descending ordered slices of the frequency domain output provided by the FFT. The first and second samples may be grouped into the first set, and the third and fourth sample may be grouped into the second set. Thus, at block 815 the magnitudes of the third and fourth samples may be subtracted from the first and second magnitudes to compute the indicated difference. The computed difference may be stored in a status register of the demodulator for output to a user, controller, or external process.

At block 820, a local oscillator correction factor is generated based on at least the computed difference. For example, a sign of the computed difference may indicate whether the local oscillator of the demodulator is at a higher or a lower frequency than the carrier frequency of the received optical signal. Based on this determination, the local oscillator correction factor may be generated to increase or decrease the frequency of the local oscillator to compensate for the offset. In certain examples, the magnitude of the difference computed at block 815 may affect the magnitude of the local oscillation correction factor (i.e., a larger magnitude of the computed difference may result in a larger degree of compensating adjustment to the local oscillator of the demodulator).

Figure 9:
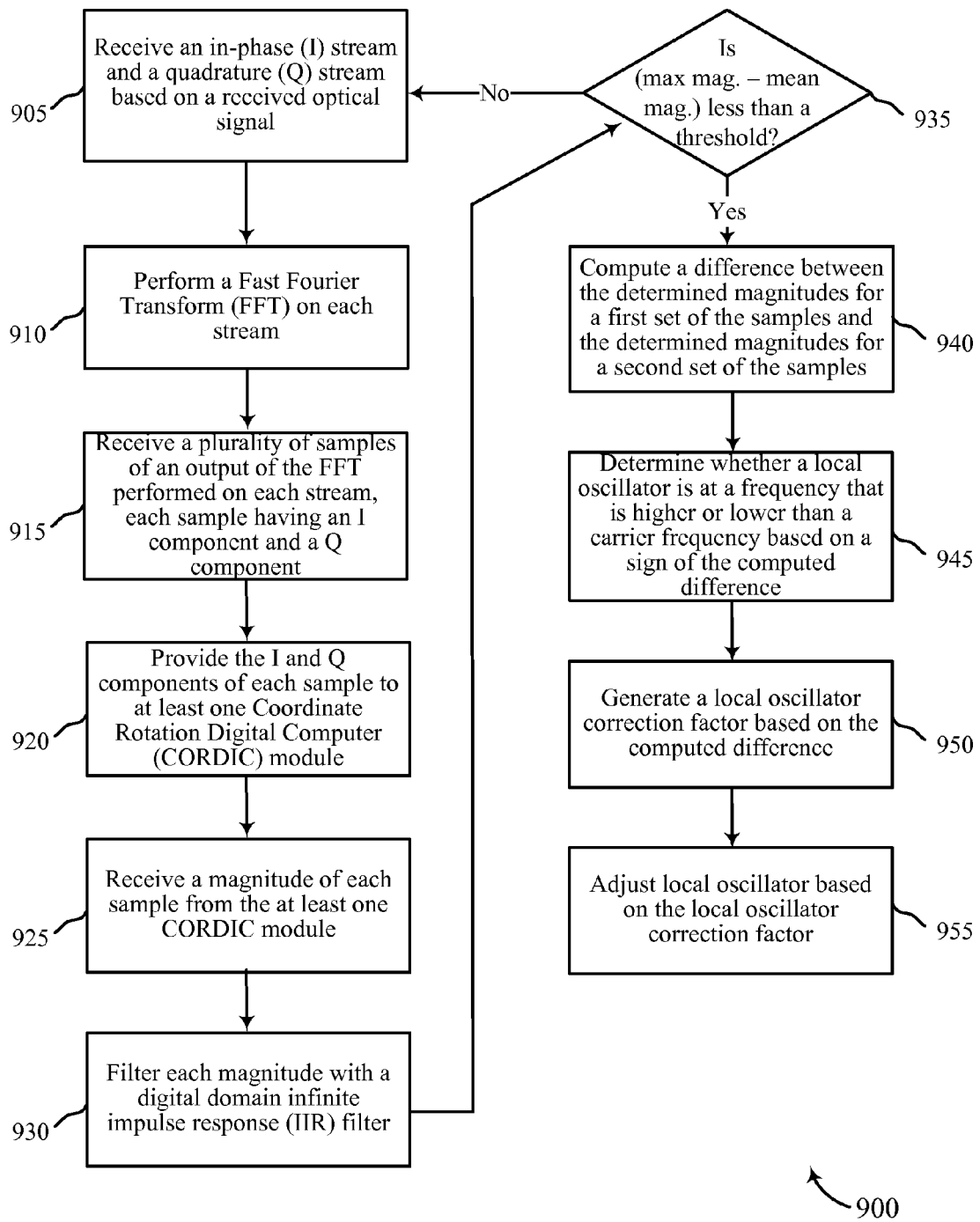
FIG. 9 is a flow chart of a method for compensating for frequency offset between a received optical signal and a local oscillator at a demodulator according to various embodiments of the principles described herein.

FIG. 9 illustrates a flowchart diagram of another example method 900 of compensating for frequency offset between a received optical signal and a local oscillator at a demodulator. The method 900 may be performed, for example, by the digital demodulation and decoding unit 125 of FIG. 1 or FIG. 3, the demodulator module 310, 400 of FIG. 3 or FIG. 4, the carrier frequency acquisition and tracking module 445 of FIG. 4 or FIG. 5, and/or the coarse frequency offset estimation and compensation module 505 of FIG. 5, FIG. 6, or FIG. 7. The method 900 may be an example of the method 800 described with reference to FIG. 8.

At block 905, an in-phase stream and a quadrature stream are received based on a received optical signal. The in-phase and quadrature streams may include bits sampled received from an O-E interface and/or a receiver fiber interface module (e.g., the receiver fiber interface module 305 of FIG. 3) based on a current frequency of a local oscillator associated with the demodulator. At block 910, a Fast Fourier Transform (FFT) is performed on each of the in-phase stream and the quadrature stream. The FFT may be performed on the streams at the demodulator, and/or at a chromatic dispersion compensation module associated with the demodulator.

At block 915, a plurality of samples is received from the output of the FFT performed on each stream. The samples may be taken substantially concurrently (e.g., during the same clock cycle). Each sample has an in-phase (I) component and a quadrature (Q) component. At block 920, the in-phase and quadrature components of each sample may be provided to at least one Coordinate Rotation Digital Computer (CORDIC) module, and a magnitude of each sample is received from the at least one CORDIC module at 925. At block 930, the magnitude of each sample is filtered with a digital domain infinite impulse response (IIR) filter. In certain examples, the IIR filter may have a transfer function H(z) with a programmable alpha parameter such that:

$$h(z) = \frac{\text{alpha}}{1 - (1 - \text{alpha})z^{-1}}$$

The programmable alpha parameter may be received as a control signal or by some other means, and stored in a register for use with the IIR filter.

At block 935 a determination is made as to whether a difference between a maximum of the magnitudes for the set of samples and a mean of the magnitudes for the set of samples is less than a predetermined threshold. This determination may aid in determining whether the received optical signal includes valid data. The predetermined threshold may be programmable, and may change for different types of optical signals, carrier frequencies, and/or modulation schemes. If the difference is not less than the predetermined threshold (block 935, No), flow returns to block 905.

If the difference is less than the predetermined threshold (block 935, Yes), a difference between the determined magnitudes for a first set of the samples and the determined magnitudes for a second set of the samples is computed at block 940. Based on the sign of the difference computed at block 940, a determination is made at block 945 as to whether the local oscillator associated with the demodulator is at a frequency that is higher or lower than a carrier frequency of the optical signal. At block 950, a local oscillator correction factor is generated based on the computed difference, and at block 955 the local oscillator is adjusted based on the local oscillator correction factor to compensate for the offset between the local oscillator frequency and the carrier frequency of the optical signal.

Figure 10:
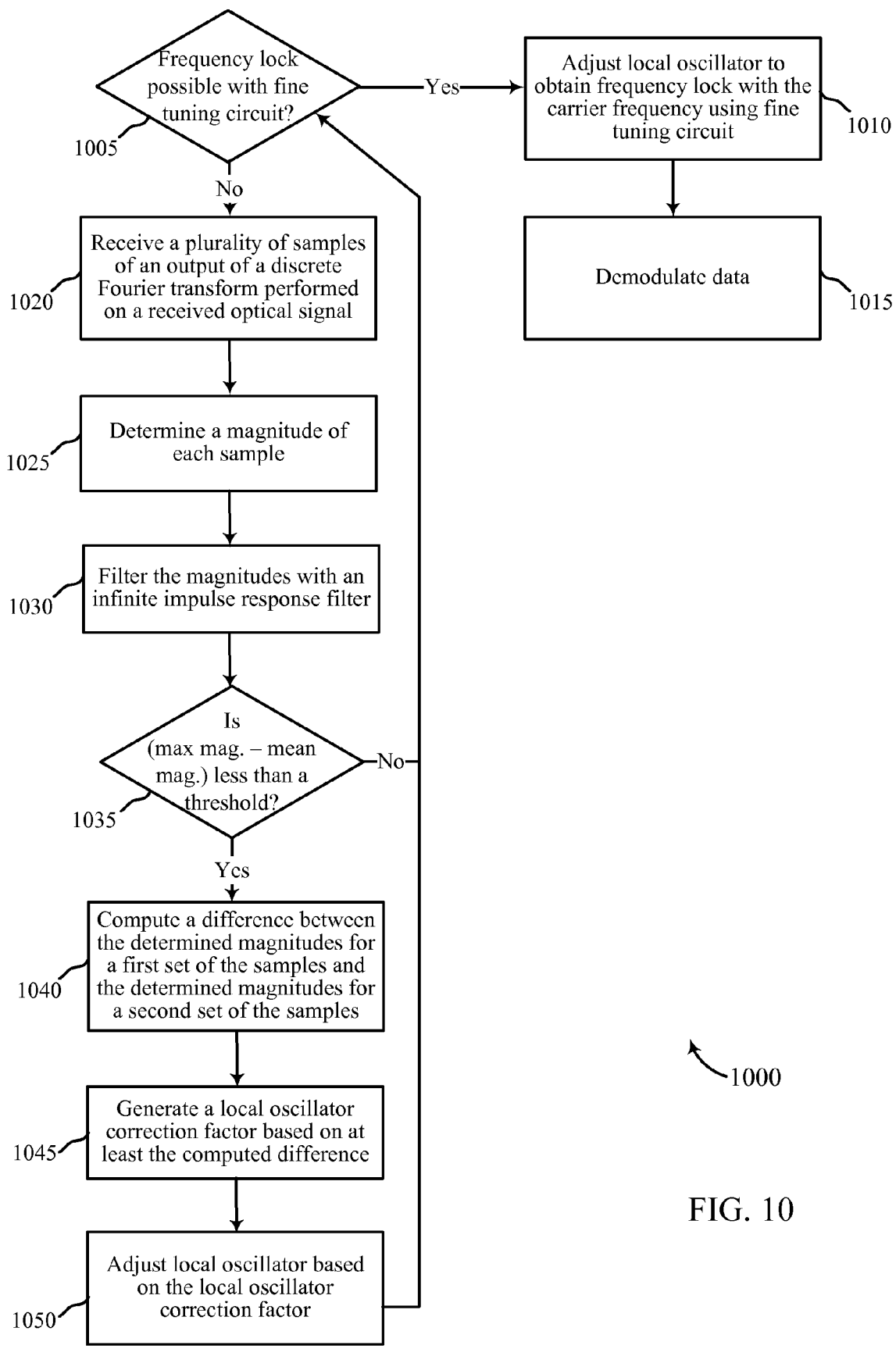
FIG. 10 is a flow chart of a method for compensating for frequency offset between a received optical signal and a local oscillator at a demodulator according to various embodiments of the principles described herein.

FIG. 10 illustrates a flowchart diagram of another example method 1000 of compensating for frequency offset between a received optical signal and a local oscillator at a demodulator. The method 1000 may be performed, for example, by the digital demodulation and decoding unit 125 of FIG. 1 or FIG. 3, the demodulator module 310, 400 of FIG. 3 or FIG. 4, the carrier frequency acquisition and tracking module 450 of FIG. 4 or FIG. 5, and/or the coarse frequency offset estimation and compensation module submodule 505 of FIG. 5, FIG. 6, or FIG. 7. The method 1000 may be an example of the method 800 described with reference to FIG. 8 and/or the method 900 described above with reference to FIG. 9.

At block 1005, a determination is made as to whether a frequency lock between the local oscillator and a carrier frequency of a received optical signal is possible using a fine tuning circuit. If such a frequency lock is possible (block 1005, Yes), the local oscillator is adjusted at block 1010 to obtain the frequency lock with the carrier frequency using the fine tuning circuit, and data is demodulated from the optical signal at block 1015.

If a frequency lock is not yet possible using the fine tuning circuit (block 1005, No), at block 1020 a plurality of samples is received of an output of a discrete Fourier transform performed on the received optical signal. The samples may be taken substantially concurrently at different portions of the frequency domain output by the discrete Fourier transform. In certain examples, the specific portions of the frequency domain output may be programmable by a user or other process. At block 1025, a magnitude of each sample is determined (e.g., using a CORDIC module or other circuitry). At block 1030, the magnitudes determined for the samples are each filtered with a digital domain IIR filter.

At block 1035, the difference between a maximum of the magnitudes and a mean of the magnitudes is computed, and a determination regarding whether the difference is less than a predetermined threshold. As noted above, this determination may reflect whether the optical signal is actually carrying data. At block 1040, a difference between the determined magnitudes for a first set of the samples and the determined magnitudes for a second set of the samples is determined, and a local oscillator correction factor is generated based on at least the difference computed in block 1045. At block 1050, the local oscillator is adjusted based on the local oscillator correction factor, and flow returns to block 1005 to determine whether a frequency lock between the local oscillator and the carrier frequency is now possible.

As will be readily understood, the components and modules described with reference to various embodiments above may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. The functions of each unit may also be implemented, in whole or in part, with instructions embodied in a memory, formatted to be executed by one or more general or application-specific processors.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of embodiments of the principles described herein.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the principles described herein. For example, the above elements may merely be a component of a larger system, wherein other rules may take precedence over or otherwise modify the application of the principles described herein. Also, a number of steps may be undertaken before, during, or after the above elements are considered. Accordingly, the above description should not be taken as limiting the scope of the invention.

What is claimed is:

1. A method of compensating for a coarse frequency offset between a received optical signal and a local oscillator at a demodulator, the method comprising:
   receiving a plurality of samples of an output of a discrete Fourier transform performed on the received optical signal;
   determining a magnitude of each sample;
   computing a difference between the determined magnitudes for a first set of the samples and the determined magnitudes for a second set of the samples; and
   generating a local oscillator correction factor based on at least the computed difference.

2. The method of claim 1, further comprising:
   determining whether the local oscillator is at a higher or lower frequency than a carrier frequency of the received optical signal based on a sign of the computed difference.

3. The method of claim 1, wherein:
   a magnitude of the local oscillator correction factor is based at least partially on a magnitude of the computed difference.

4. The method of claim 1, wherein the receiving the plurality of samples comprises:
   receiving each of the samples during a single clock cycle.

5. The method of claim 1, further comprising:
   receiving the output of the discrete Fourier transform from a chromatic dispersion compensation module of the demodulator.

6. The method of claim 1, further comprising:
   adjusting a frequency of the local oscillator based on the local oscillator correction factor.

7. The method of claim 6, further comprising:
   identifying a maximum magnitude and a mean of the determined magnitudes for the samples; and
   determining that the received optical signal comprises valid data based on a difference between the identified maximum magnitude and the mean of the determined magnitudes for the samples;
   wherein the adjusting the frequency of the local oscillator occurs in response to determining that the received optical signal comprises valid data.

8. The method of claim 1, wherein each of the samples comprises an in-phase component and a quadrature component, the determining the magnitude of each sample further comprising:
   providing the in-phase and quadrature components of each sample to at least one Coordinate Rotation Digital Computer (CORDIC) module.

9. The method of claim 8, wherein the determining the magnitude of each sample further comprises:
   receiving the magnitude of each sample from the at least one CORDIC module.

10. The method of claim 1, further comprising:
    filtering each of the determined magnitudes with a digital domain filter.

11. An apparatus for compensating for a coarse frequency offset between a received optical signal and a local oscillator at a demodulator, comprising:
    a sampling module configured to receive a plurality of samples of an output of a discrete Fourier transform performed on the received optical signal;
    a magnitude determination module configured to determine a magnitude of each sample;
    an offset determination module configured to compute a difference between the determined magnitudes for a first set of the samples and the determined magnitudes for a second set of the samples; and
    a local oscillator correction module configured to generate a local oscillator correction factor based on at least the computed difference.

12. The apparatus of claim 11, wherein the local oscillator correction module is further configured to:
    determine whether the local oscillator is at a higher or lower frequency than a carrier frequency of the received optical signal based on a sign of the computed difference.

13. The apparatus of claim 11, wherein:
    a magnitude of the local oscillator correction factor is based at least partially on a magnitude of the computed difference.

14. The apparatus of claim 11, wherein the sampling module is further configured to:
    receive each of the samples during a single clock cycle.

15. The apparatus of claim 11, further comprising:
    a chromatic dispersion module;
    wherein the sampling module is further configured to receive the output of the discrete Fourier transform from the chromatic dispersion compensation module of the demodulator.

16. The apparatus of claim 11, wherein the local oscillator correction module is further configured to:
    adjust a frequency of the local oscillator based on the local oscillator correction factor.

17. The apparatus of claim 16, further comprising:
    a signal verification module configured to:
      identify a maximum magnitude and a mean of the determined magnitudes for the samples; and
      determine that the received optical signal comprises valid data based on a difference between the identified maximum magnitude and a mean of the determined magnitudes for the samples;
    wherein the adjusting the frequency of the local oscillator occurs in response to a determination that the received optical signal comprises valid data.

18. The apparatus of claim 11, wherein each of the samples comprises an in-phase component and a quadrature component, the magnitude determination module being further configured to:
provide the in-phase and quadrature components of each sample to at least one Coordinate Rotation Digital Computer (CORDIC) module; and
receive the magnitude of each sample from the at least one CORDIC module.

19. The apparatus of claim 11, further comprising:
a filtering module configured to filter each of the determined magnitudes with a digital domain filter.

20. A system of compensating for a course frequency offset between a received optical signal and a local oscillator at a demodulator, the system comprising:
means for receiving a plurality of samples of an output of a discrete Fourier transform performed on the received optical signal;
means for determining a magnitude of each sample;
means for computing a difference between the determined magnitudes for a first set of the samples and the determined magnitudes for a second set of the samples; and
means for generating a local oscillator correction factor based on at least the computed difference.

21. The system of claim 20, further comprising:
means for filtering each of the determined magnitudes with a digital domain filter.

22. The system of claim 20, further comprising:
means for determining whether the local oscillator is at a higher or lower frequency than a carrier frequency of the received optical signal based on a sign of the computed difference.

23. The system of claim 20, wherein:
a magnitude of the local oscillator correction factor is based at least partially on a magnitude of the computed difference.

24. The system of claim 20, further comprising:
means for identifying a maximum magnitude and a mean of the determined magnitudes for the samples; and
means for determining that the received optical signal comprises valid data based on a difference between the identified maximum magnitude and a mean of the determined magnitudes for the samples; and
means for adjusting the frequency of the local oscillator based on the local oscillator correction factor in response to determining that the received optical signal comprises valid data.

* * * * *